J. E. GOODWIN.
TRANSPLANTER.
No. 181,065. Patented Aug. 15, 1876.
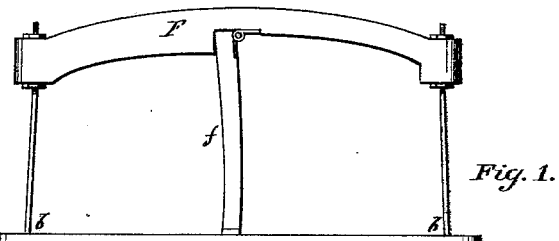
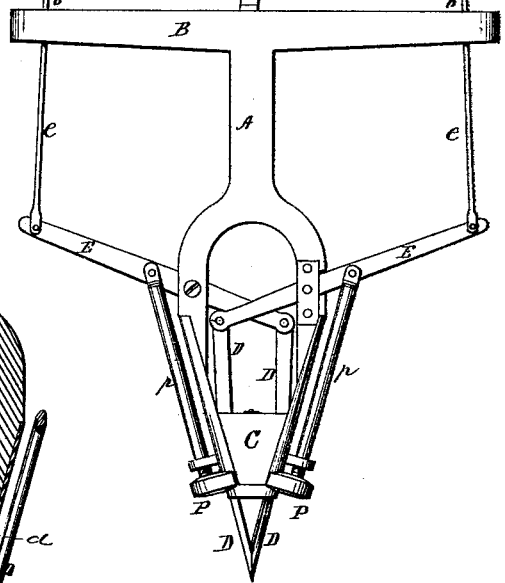
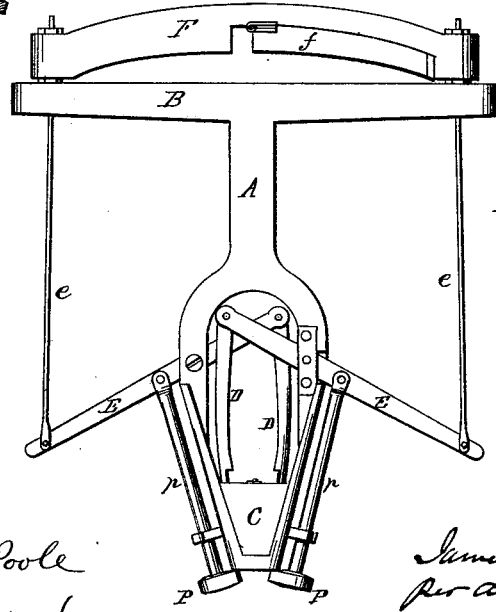

UNITED STATES PATENT OFFICE.

JAMES E. GOODWIN, OF ROCKBRIDGE COUNTY, VIRGINIA.

IMPROVEMENT IN TRANSPLANTERS.

Specification forming part of Letters Patent No. 181,065, dated August 15, 1876; application filed July 26, 1876.

*To all whom it may concern:*

Be it known that I, JAMES E. GOODWIN, of Rockbridge county, Virginia, have invented a new and useful Improvement in Transplanters, of which the following is a clear, full, and exact description, reference being had to the accompanying drawings, making a part of this specification, in which—

Figure 1 shows a side elevation of my invention. Fig. 2 shows the same with the blades withdrawn. Fig. 3 represents a vertical section through $x$ $x$.

The object of my invention is the transplanting of tobacco, cabbage, and other plants of a similar character, without damage to the tender stalks, and securing a proper packing of the earth around them; and it consists in the combination of devices hereinafter explained and claimed.

To enable others skilled in the art to make and use my invention, I will proceed to describe the exact manner in which I have carried it out.

In the drawings, A represents the frame, to which are secured the operative devices, and having the cross-head B, provided with the slots $b$ $b$ at each end, for a purpose hereafter explained. The frame A is bifurcated at its lower end, and between the points of the bifurcation is secured the guide-block C, provided with a central opening, $c$, for the admission of the stems of the plants to be transplanted. On the outer side of the guide-block are longitudinal slots or openings $d$ $d$, for the passage of the blades D D, as the latter are operated by the toggle-levers E E, connected to the supplemental cross-head F by the rods $e$ $e$. The cross-head F has attached to its under side a hinged arm, $f$, which reaches to and rests upon the cross-head B, when the cross-head F is raised, and the blades are in a position to be forced into the ground, as shown in Fig. 1.

It is evident the arm $f$ will brace the transplanter, and enable the operator to force the blades into the earth. When this has been accomplished, the hinged arm $f$ is thrown up, as shown in Fig. 2, and the supplemental cross-head F being forced down upon the cross-head B, the toggle-levers E E force the blades D D from the earth, while the packers P P, attached to the levers by the rods $p$ $p$, press the earth around the transplanted stem, and also prevent any displacement of the earth by the withdrawal of the blades.

In a full-sized transplanter, I usually make the opening in the center of the guide-block about one and a half inch in diameter; and to adjust the machine to very small plants, I place a sectional diaphragm, $c'$, of leather or other suitable material, as shown in Fig. 4, and these two sections act as a clamp for holding in position the most delicate stems without injury to the plants.

The slots $b$ $b$ in the cross-head B afford play to the rods $e$ $e$ as they slide up and down with the cross-head F.

Attached to the lower edge of the guide-block C may be a projection on which to place the foot of the operator while forcing the transplanter into the earth.

Having thus described my invention, what I claim as new, and desire to secure by Letters Patent, is—

1. The bifurcated frame A and guide-block C, provided with the openings $d$ $d$, in combination with the blades D D, toggle-levers E E, rods $e$ $e$, and supplemental cross-head F, substantially as and for the purpose set forth.

2. The bifurcated frame A and guide-block C, provided with the slots $d$ $d$, in combination with the blades D D, toggle-levers E E, rods $e$ $e$, supplemental cross-head F, provided with the arm $f$, and the packers P P, attached to the levers by rods $p$ $p$, all constructed substantially as and for the purpose set forth.

3. The guide-block C, in combination with the sectional diaphragm $c$, substantially as and for the purpose set forth.

JAMES E. GOODWIN.

Witnesses:
 WILL. H. MOXON,
 JNO. D. PATTEN.